Figure 1:
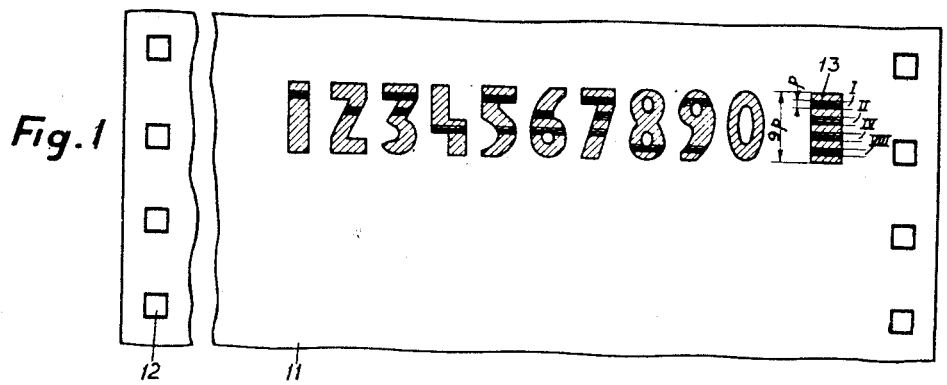

March 5, 1957

A. CHAIMOWICZ 2,784,392

DATA RECORDING SYSTEM

Filed Jan. 22, 1953

5 Sheets-Sheet 1

March 5, 1957

A. CHAIMOWICZ 2,784,392

DATA RECORDING SYSTEM

Filed Jan. 22, 1953

5 Sheets-Sheet 2

March 5, 1957 A. CHAIMOWICZ 2,784,392
DATA RECORDING SYSTEM
Filed Jan. 22, 1953 5 Sheets-Sheet 3

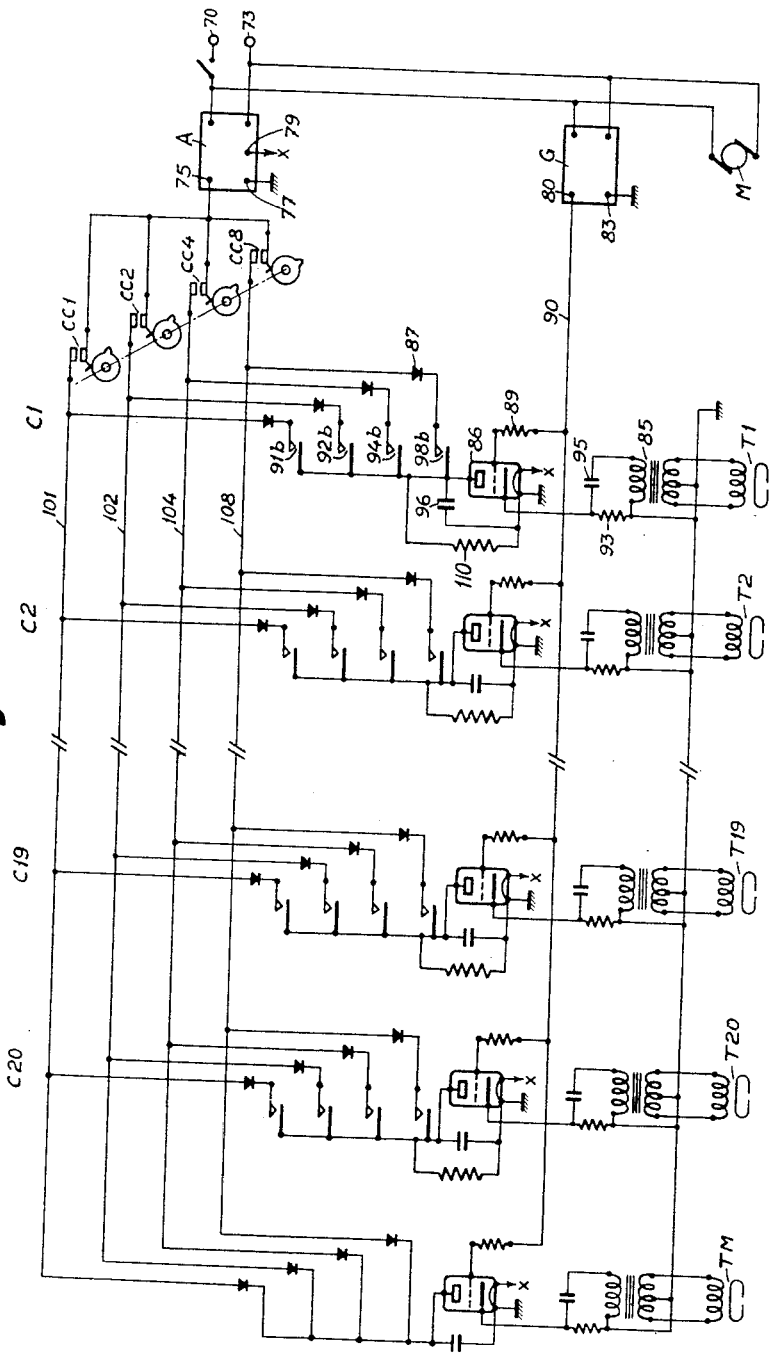

March 5, 1957

A. CHAIMOWICZ 2,784,392

DATA RECORDING SYSTEM

Filed Jan. 22, 1953

5 Sheets-Sheet 5

Fig. 7

United States Patent Office 2,784,392
Patented Mar. 5, 1957

2,784,392
DATA RECORDING SYSTEM

Adam Chaimowicz, Paris, France, assignor to Compagnie des Machines Bull (Societe Anonyme), Paris, France Application January 22, 1953, Serial No. 332,652

Claims priority, application France February 7, 1952

11 Claims. (Cl. 340—174)

The present invention generally concerns the control elements of accounting or statistical machines (cards, tape, film etc.) and machines which allow the recording of accounting or statistical data by means of magnetic impression on the said control elements.

Processes are known which allow the recording of alphabetical or numerical data on record cards, for example, by means of a visible impression in a zone of the card, and at the same time an invisible magnetic impression in another zone of the same card. When magnetically recorded, the different digits or characters are represented by magnetized index positions, differently arranged according to a simple or a combined code. The magnetization of the desired index positions is accomplished in a uniform manner, in other words, by means of recording heads fed by a direct current. This process is not very effective, and the recording surfaces require much space.

According to other processes, the various digits and characters are magnetically recorded in horizontal lines and the values of each are characterised by a distinct frequency, thereby necessitating the use of frequency filters for the recording as well as for the reading.

As a general rule, every possible magnetic recording position on the support is provided with magnetizable material, thereby requiring that these supports be specially prepared.

The present invention provides a process for the recording of accounting or statistical data on supports (cards, paper tape, films etc.) which do not require any special preparation, and consists in using a special printing machine which for the visible printing, employs a colored material also having magnetic properties so that the location of a data article for the visible impression coincides with the location for the magnetic impression of the same data article.

According to this process, in a line of characters, digits or letters, printed visibly, the height of the characters is divided into a certain number of separate zones for magnetic impression, each zone symbolizing a code component, and the number of zones being adapted so as to form at least all the coded combinations representing the characters anticipated.

The magnetic impression, performed in the deposited material, constituting a printed character, consists in magnetizing only this zone or the zones corresponding to the coded value of the said character, according to the code which has been adopted.

As concerns the control of calculating organs, the binary system may be utilized advantageously for the codification of the digits.

According to this process, the magnetization of each zone of characters to be magnetized is obtained during the displacement of the support for the printed characters, in relation to a recording head, by an alternating induction field produced by the said head, by means of impulses of alternating current, comprised of several alternations which will later be called frequency impulses.

According to the invention, to each character recording line is added at least one mark in magnetizable material which after magnetization is made up of separate zones of magnetic impression practically aligned in the prolongation of the zones of magnetic impression for the recorded characters. This permits, during the analysis of the said mark in the controlled machine, the production of synchronization impulses, thereby simplifying the problems of mechanical synchronization of the devices for feeding the recording supports, during the analysis of these supports.

The present invention also provides a recording machine for applying the recording process herein mentioned, including organs which are controlled by a key-board, for the visible impression of the characters on paper tape for example, and for the storing of the coded values of the said characters, means for moving a part of the tape bearing a line of printed characters before a series of recording heads, supply sources of direct and alternating current, commutation and selection means for applying frequency impulses to the said recording heads under control of the storage organs during the movement of the paper tape.

The recording process according to the invention offers the following advantages: the characters visibly and magnetically printed may be read directly visually by an operator and may also control an accounting or statistical machine adapted to the analysis of coded magnetic impressions; the utilization of inexpensive recording supports, especially card or ordinary paper tape; maximum reduction of recording surface, thereby bringing about an economy in price, weight and bulk of the record supports.

The recording machine which will herein be described, merely by way of example is of the key-board control type, and its construction is similar to that of a typewriter-machine.

Provision is made for recording digits or letters on a paper tape, bearing perforations on both its borders, which insures the exact and uniform positioning of the lines horizontally recorded.

By the successive striking of the keys, the characters are first visibly printed on a recording line. The printing material of the ribbon is made up of an iron oxide powder or a composition of high residual magnetism, added to a binder and a suitable coloring matter. The U. S. Allyn Patent No. 2,584,318 discloses a suitable printing material made up of magnetizable colored iron oxide powder and a binder. Each time a character, letter or digit is printed, the striking of the corresponding key causes the storage of its coded value in a coded relay storage device, with the appropriate shift corresponding to the position then occupied by the carriage which holds the paper tape. At the end of the line, the operator prints the mark, added for each line as has previously been explained.

The operator then presses a special key which causes the magnetic impression of the line which has just been visibly printed. If desired, these last two operations could be made automatic. The magnetic impression is obtained by the relative displacement of the paper tape with respect to a series of magnetic recording heads, and by the selective and synchronized supplying of the said heads with frequency impulses, this selection naturally being controlled by the relay storage device. This device is automatically re-set to zero after the magnetic impression.

It would of course be possible to proceed with the magnetic impression of each character immediately after its visible impression, but the economy of material realized with the recording heads and with the relay storage device would be counter balanced by a less rapid functioning of the machine.

The realization of the invention will be more fully understood when reading the following description of a manner of realization, and by the diagrams included by way of a non-restrictive example, which show:

Fig. 1, showing as an example the number 1,234,567,890 recorded on a paper tape.

Figure 2A:
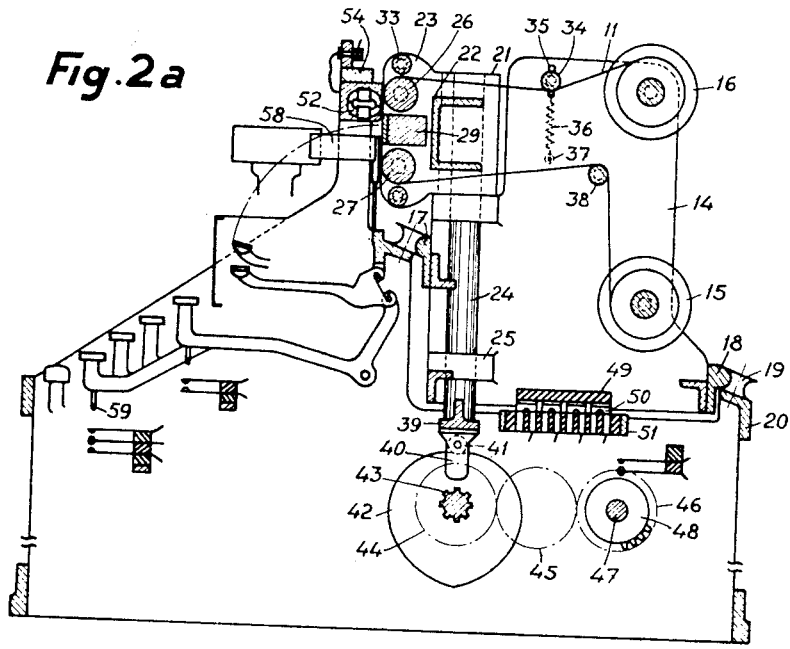
Figure 2B:
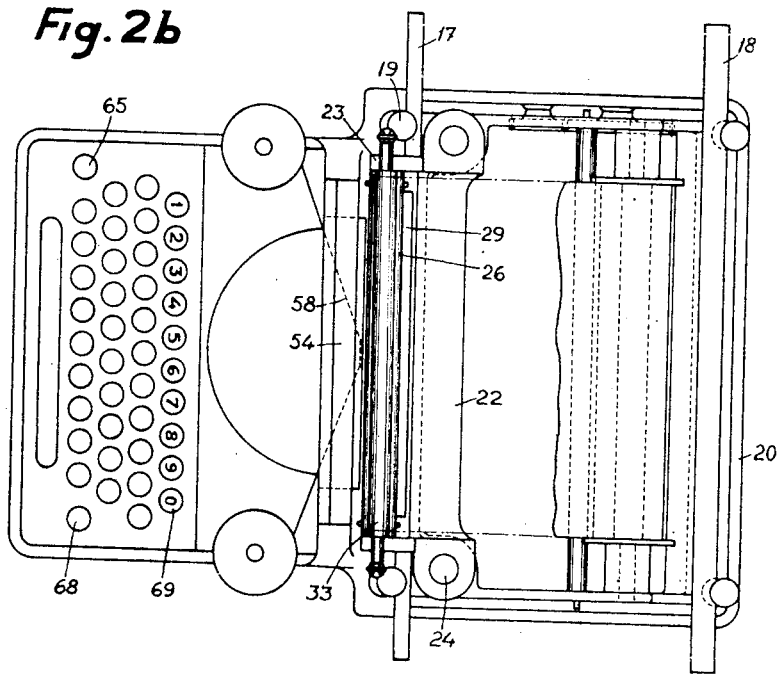

Figs. 2a and 2b, a cross section view and a top view respectively of a recording machine of the type-writer model.

Figure 3:
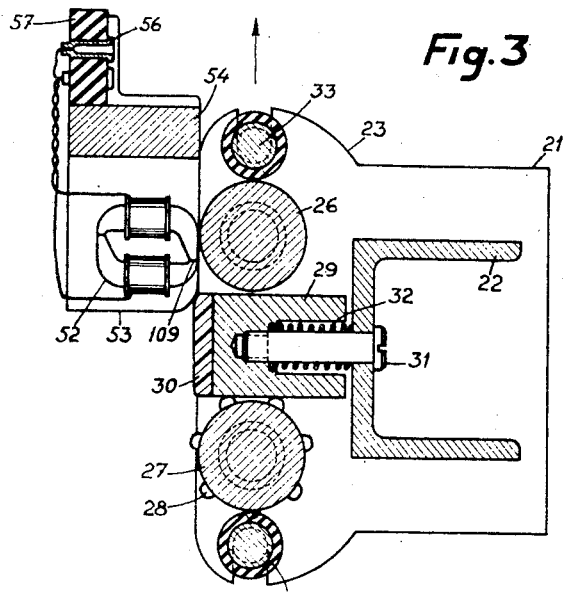

Fig. 3, a partial section of the same machine on a larger scale.

Figure 4A:
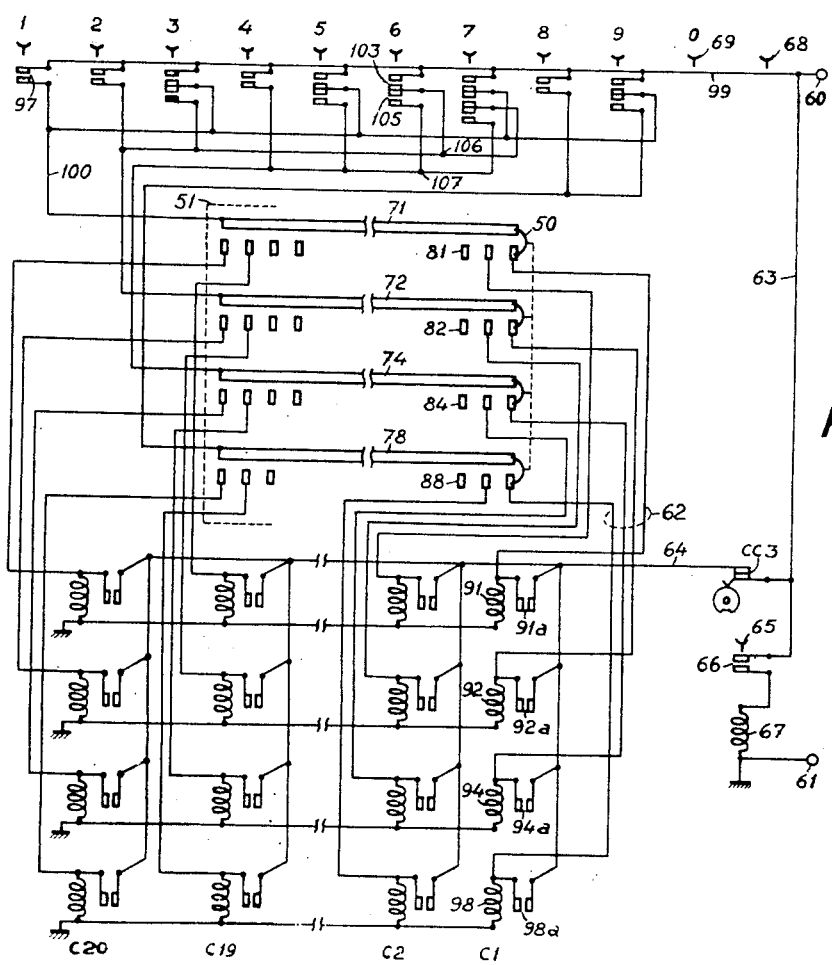

Figs. 4a–4b, a diagram of the electric circuits of the machine.

Figure 5:
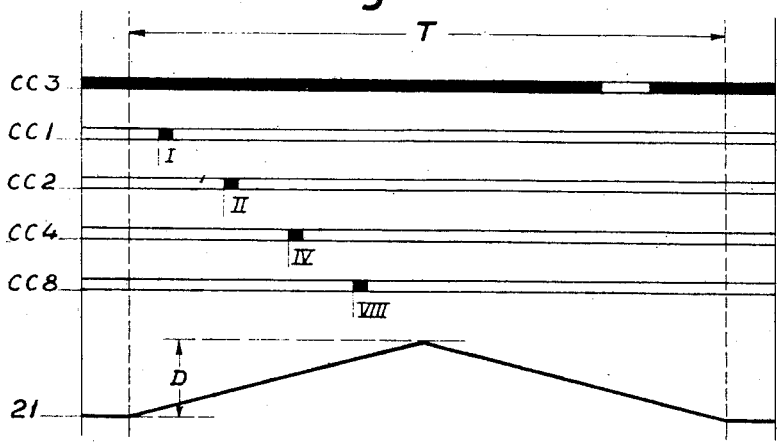

Fig. 5, a diagram of the functioning of the organs for feeding the tape, and of the functioning of the cam contacts.

Figure 6:
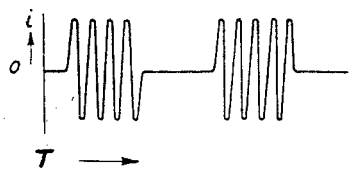

Fig. 6, a representation of frequency impulses.

Fig. 7, a model of a record card according to the invention.

Fig. 1 represents the numbers 1 to 0 recorded according to the invention process, on a paper tape 11. The paper tape 11 is provided with perforations 12, preferably spaced at an interval between the successive recording lines. The shapes of the numbers indicated by the hatched contours are not obligatory. In any case, it may be remarked that the thickness of the stroke of which each figure is formed, is considerable as compared to the total width of the said figure. The material used for the visible impression is according to the invention, made up of a pulverized material composed of iron or an alloy of high residual magnetism. Often, this material is of a color which is naturally distinguishable from that of the paper.

A positioning mark 13 is printed with the same material as the characters, at the end of the recorded line. It is assumed that the height of the printed characters is divided into several horizontal zones which are practically equal. In Fig. 1, only the zones bearing the reference numbers I, II, IV, VIII and the horizontal hatchings are to be magnetized during the magnetic impression.

The magnetic recording of each of the numbers will be accomplished by magnetizing one or several of the zones I, II, IV, VIII according to the binary code, for example. In Fig. 1, it is seen that each of the reference points distinguishing the various magnetic impression zones, corresponds to the binary component assigned to it. For example, the number 7 is magnetized in zones I, II, IV, for which the sum of the binary components equals 7. Positioning mark 13 will be magnetized in four zones I, II, IV, VIII.

For simplification of the description, the letters of the alphabet which may be recorded by the same process have not been represented.

With reference to letters, a four position code becomes inadequate; it is therefore necessary to make provision for a five position code (31 combinations) or even a six position code (63 combinations) and to increase the height of the characters.

In order to increase working efficiency, at the magnetic impression as well as at the ulterior reading, the impression zones are not magnetized by constant induction field, but by an alternating field. Considering the feed-rate of the paper tape past the magnetic heads (10 to 30 cm./s.) and the minimum number magnets per zones, it is seen that the most favorable frequencies for the alternating variations of the induction field lie between 500 and 3000 periods per second.

The maximum height of the characters is limited only by problems of size and reasonable surface for each character to be visibly printed. The height of the characters may not go below a certain limit, since the minimum height of each zone (distance $p$ in Fig. 1) cannot be utilized if very much below 0.5 mm. approximately, because of the possible occurrence of deviations of the paper tape.

The recording machine intended by way of realization of an example (Figs. 2a, 2b, 3) is constructed along the same lines as an ordinary type writing machine. This is especially true for the keys, the operating levers, the character levers, the devices for advancing the carriage step by step and for tabulation, the feeding devices for the printing ribbon all of which may be of a usual model and do not require any special description.

Carriage 14 includes a feed drum 15 and a take up drum 16, the former for feeding and the latter for taking up paper tape 11. The carriage may be moved lengthwise the two rails 17 and 18 cooperating with rollers 19, attached to the frame 20 of the machine. The carriage includes a mobile element 21 which may be moved in a reciprocal vertical movement. This mobile element is composed of a U-shaped body 22 with two side plates 23 to which two pillars 24 are joined. These pillars slide in bosses 25 of the side plates of carriage 14.

Two revolving rollers 26, 27, are included between side plate 23 (Fig. 3). Roller 27 is provided with two rows of positioning sprockets 28, of which the circumferential spacing corresponds to the vertical spacing of the holes 12 of paper tape 11 (Fig. 1). The transversal spacing of sprockets 28 obviously corresponds to the spacing of the holes 12 of the tape.

Platen 29 (Figs. 2a and 3) gives a supporting surface to the paper during the striking of the characters. To this end, a band 30 of hard plastic material (synthetic rubber for example) is attached to the appropriate side of the platen.

The mounting of platen 29 by means of screw 31 and spring 32, onto body 22 allows a slight horizontal movement of the said platen.

Two pressure rollers 33 (Figs. 2a–2b) are jointly arranged with rollers 26 and 27 (Fig. 3). Each roller 33 is composed of a rubber covered axle. This axle journals in two notches of the side plate 23, and the extremities of the axle protruding from the side plate are adapted so that a tension spring may be attached to them, so that the two rollers 33 will be drawn towards rollers 26 and 27 respectively.

Sprockets 28 of roller 27 are also used for regulating the advancement rate of the tape. For this purpose, two spring catches (not represented) may be fixed each to a side plate 23, in the space remaining between platen 29 and each of the said side plates (see Fig. 2b).

In Fig. 2a, a tension roller 34 is seen, of which the extremities slide in two slots 35 on the side plates of carriage 14, and are urged downward by two tension springs 36, attached to two lugs 37 attached to the carriage. A rod 38 is used as a brace for the side plate of the carriage and as guide for the paper tape.

The paper tape passes from feed roller 15, over brace-rod 38, between lower roller 33 and roller 27, between upper roller 33 and roller 26, under tension roller 34, and is re-rolled on take-up drum 16.

The lower extremities of pillars 24 (Fig. 2a) are connected by a brace-bar 39 to the middle of which two corner-plates 40 bearing a roller 41 are attached. Between the corner-plates and under the roller is a cam 42, which is sometimes moved by, and sometimes slides on splined shaft 43. This shaft is integral with a gear wheel 44, and due to intermediary gear wheel 45 may be moved by gear wheel 46, which is integral with intermediary shaft 47.

Intermediary shaft 47 may receive the movement of an electric motor, preferably by a train of speed reducing gears, when a "one turn" clutch is electromagnetically put into action. Since these driving and clutching devices are well known in the technique of accounting machines, they have been omitted in the drawing.

Intermediate shaft 47 bears five cams 48, which control the contacts, the role of which will be explained when the explanation of the electric circuits is given.

The profile of cam 42 is designed so that the upward stroke of mobile element 21 will be linearly proportional to the rotation angle of shaft 43, i. e. proportional to the elapsed time. This stroke is represented by height D in Fig. 5.

The carriage also bears the mobile organ of a quadruple commutator, this organ being composed of an insulating body 49 Fig. 2a supporting four contact blades 50. These blades establish contacting bridges between four series of contact segments included in the stationary part 51 of the commutator which is attached to the frame of the machine. By displacement of the carriage, the commutation of the storage circuits may be brought about, as will be explained further on.

The part used for magnetic impression includes a series of magnetic heads 52 (Figs. 2a–3) viz. twenty heads for the magnetic impression of the characters printed and one for the magnetic impression of the positioning mark. The magnetic heads are fixed in recessed blocks 53, of non-magnetic metal (brass, aluminium etc.) which are sized and adjusted so that the heads 52 will be in line with the printed characters. The row of blocks 53 is itself screwed to a bracket 54, which is joined to the frame of the machine.

The construction of the magnetic heads is the same as in sound recording and play-back heads: the cores are made up of very thin laminations of an iron alloy having a high permeability, the width of the air-gap is extremely small: around a few tens of microns.

The two output leads of each magnetic head winding are each (Fig. 3) connected to a connection socket 56, sockets 56 being fixed to a plate of insulating material 57, mounted on bracket 54.

The magnetic heads are arranged so that there is only a slight space between them and roller 26, this space however being large enough to allow the passage of the paper tape. When mobile element 21 is moved vertically, the paper tape is pressed against the block of the magnetic heads by platen 29, under the action of springs 32.

In Figs. 2a and 2b printing ribbon 58 is also seen. As has already been indicated, this ribbon should be impregnated with magnetizable material in a pulverized form.

Since storage circuits are to be influenced each time that a character is visibly printed, one or several electric contacts provided under each key, may be closed by one of the insulated end extensions 59, under the key levers.

The relays and other electric organs of the storage device are arranged in the remaining free space of the lower part of the machine, or in a special separate case connected to the machine by means of a cable.

The electric diagrams of the storage and magnetic impression devices are found in Figs. 4a and 4b.

Each of the keys for numbers 1 to 9 (Fig. 4a) is associated with one or a plurality of contacts, which are closed at the end of the striking movement of the key. A supply source of direct current is connected to terminals 60, 61 for the energization of the relays.

Terminal 61 is also connected to the mass of the machine. Stationary part 51 of the quadruple commutator mentioned above, includes four common segments 71, 72, 74, 78 and twenty sets of contact studs 81, 82, 84, 88, one set including 4 studs corresponding to 1 column of characters in the realization example here contemplated. The four contact blades 50 included in the mobile part of the commutator which is fixed to the carriage are also shown in Fig. 4a.

Twenty sets of relays 91, 92, 94, 98 make up the data storing device, one set corresponding to one character column.

For each character column, studs 81, 82, 84, 88 are connected separately to relays 91, 92, 94, 98 in the following manner: stud 81 to relay 91, stud 82 to relay 92 and so on, by means of the grouped connections in one of the cables 62.

Each relay, when energized controls the closing of a holding contact marked with the reference letter $a$. As soon as one of the relays is momentarily energised, a holding circuit such as the following is established: terminal 60, conductor 63, cam contact CC3 which is normally closed, conductor 64, one of the contacts 91a to 98a, the corresponding relay, ground.

When energized, each relay also controls the closing of a reference letter $b$ (Fig. 4b) contact.

Key 65 (Fig. 4a), when struck, closes contact 66, thereby causing the energization of winding 67 of a "one turn" electromagnetic clutch in order to couple the motor with intermediary shaft 47, which has already been mentioned. One turn of this shaft, hence of cam 42 (see Fig. 2a) constitutes the period of magnetic recording and is represented by time length T in Figure 5. During this time, the closing of cam contacts CC1, CC2, CC4, CC8 (Fig. 4b) takes place as indicated in the Fig. 5 diagram, in synchronism with the rising of the paper tape, carried by mobile element 21 (Fig. 2a) and CC3 (Fig. 4a) opens in order to de-energize the storage relays.

Key 68 (Fig. 4a) which controls the visible impression of the positioning mark, and key 69, which controls the visible impression of the digit zero, do not put any contact into action, when struck. If however, the magnetic printing of the value zero were desired for control purposes, the binary combination 8+2=10 could be adopted, and two contacts and the necessary connections could be provided. The magnetic impression organs are shown in Fig. 4b.

The following organs are connected to terminals 70, 73, of a source of alterating current: a supply set A, a generator G, and a motor M. Set A provides a direct voltage of about 250 volts between its terminals 75 and 77 and between its terminals 77 and 79, provides an alternating voltage for the heaters of the electronic tubes. Generator G provides an alternating voltage between its terminals 80, 83, with the carrier frequency mentioned above.

T1 to T20 and TM are the windings of the magnetic recording heads, for the 20 columns of characters and for the positioning mark respectively.

Each recording head is, through the intermediary of a transformer 85, connected with an electronic tube 86, which may be a triode of the low frequency amplifier type.

These triodes are arranged in "cathode follower" fashion with the anode current flow controlled between either zero or full level. The cathode load is constituted by resistor 93 for D. C. and by the impedance seen through the impedance matching transformer 85, for A. C.

Lines 101, 102, 104, 108 are fed with voltage in the order mentioned, by the closing of cam contacts CC1, CC2, CC4, CC8 (see diagram of Fig. 5).

Organs 87 are unidirectional conduction elements, such as copper-oxide or selenium cells. They are necessary in order to avoid undesirable parallel circuits.

Each triode 86 has its control connected to connection 90 through a resistor 89, of about 1 megohm. When generator G operates, the grid of each triode is submitted to the alternating voltage of the carrier frequency source.

When at least one of the lines 101 to 108 is under voltage, and one of the contacts 91b to 98b is closed in the anodic circuit of a triode, a D. C. positive voltage modulated by the alternating voltage at the carrier frequency, is created at the terminals of the corresponding resistor 93.

The alternating component is transmitted by capacitor 95 to the primary of transformer 85, of which the secondary is connected to the ground by a medium tap.

The alternating current induced in the secondary of transformer 85 circulates in the winding of the head which is attached to it, and produces an alternating induction flux in order to alternately magnetize a printed character when the paper tape which bears it is displaced at a suitable speed, near the air-gap of the said head.

A condenser 96 and a resistor 110 are connected between the anode of each triode and the ground, in order to eliminate the eventual commutation transient voltages.

Let it be assumed that the machine is in operation and the operator wishes to record the number 16 in the first and second columns of the paper tape suitably placed in the machine.

The operator first strikes the digit 1 key, which visibly prints this digit in the first left hand column of the tape. Contact 97 (Fig. 4a) is momentarily closed by the striking of key 1. During this time, a circuit is established: terminal 60, line 99, contact 97, line 100, common segment 71, contact blade 50, extreme right hand segment 81, one of the conductors of cable 62 (extreme right), relay 91 of column C1, ground.

Contact 91a then closes, which results in 91 remaining energized as long as CC3 is not open. Corresponding contact 91b therefore also remains closed (Fig. 4b).

The carriage having been automatically displaced by one step, the operator strikes the digit 6 key for the visible impression of the second character. The closing of contacts 103 and 105 (Fig. 4a) establishes the circuits: terminal 60, 99, then a circuit by contact 103, 106, common segment 72, mobile blade 50, stud 82 (second from the right) a conductor of one of the cables 62, relay 92 of column C2, ground; then another parallel circuit: contact 105, 107, common segment 74, mobile blade 50, stud 84 (second from the right), a conductor of one of the cables 62, relay 94 of column C2, ground. By the closing of corresponding contacts 92b and 94b (Fig. 4b) the number 6 is therefore stored under the binary form 2+4.

The operator then brings the carriage to the visible impression position of the last column, and strikes key 68 for printing the positioning mark.

The carriage is brought back so that the characters and marks visibly printed will be correctly aligned with the corresponding magnetic heads, which is easily obtained if two index references have been provided of which one is fixed to the carriage and the other to the structure of the machine.

The magnetic impression phase may now be brought about by depressing key 65. The rotation of the intermediary shaft which results therefrom is manifested by the operation of cam 42 and the cams controlling the various cam contacts.

The part of paper tape 11 held between rollers 26, 27 and 33 which do not rotate at this time, is then vertically displaced by the upward movement of mobile element 21, so that all the vertical length of the line which has just been visibly printed passes before the horizontal line of air-gaps 109 of the magnetic heads (Fig. 3), while the cam contacts CC1, CC2, CC4, CC8 close in accordance with the diagram shown in Fig. 5.

Since in column C1, contact 91b is closed, magnetic head T1 receives a frequency impulse at time I, i. e. during the closing of CC1. In the same manner, head T2 receives a frequency impulse at times II and IV, by the closing of contacts 92b and 94b (column C2). Finally, head TM receives a frequency impulse at each of the times I, II, IV, VIII.

It follows that the numbers 1 and 6 are now magnetically printed by frequency impulses according to the symbolic representation of Fig. 1, as is also the positioning mark 13.

During the rotation of cam 42, and while mobile element 21 is again lowered, cam contact CC3 opens, thereby cutting all the holding circuits of relays 91 and 98, and resetting the storage device to zero.

The operator may then control the advancement of the paper tape by one line spacing preferably by actuating roller 16 (Fig. 2a) by any suitable means. The machine is again ready for the visible and magnetic impression of another line of characters.

Though the application of the invention to a special type of machine has been shown, it is needless to say that modifications, additions, and omissions could be made, while still remaining within the scope of the invention.

One way in which these changes could be applied is in connection with the printing mechanism of a tabulator, normally controlled by the data reading devices or by totalizer readout devices.

The invention may be used for recording data on cards for accounting machines according to several methods. According to a first method, for example, a tape once recorded is then subsequently sectioned into separate cards.

According to a second method, the card (see Fig. 7) bears card feeding perforations 12 on both its sides, and positioning marks 13, similar to those of the tape shown in Fig. 1. Five recording lines are easily used in a standard 80 column card, the number of columns here being reduced to 40. This utilization example of the standard card is given merely by way of illustration. The cards are carried by two flexible metal bands provided with protruding pins which enter the card feed perforations, the cards thus take the place of band 11 of Fig. 2a.

I claim:

1. In apparatus for producing printed characters each having associated areas magnetized in individual code combinations for each of said characters, the combination of a plurality of electromagnets arranged in a preselected configuration, magnetizable printing ink, means for printing said characters using said ink, and means including said electromagnets for magnetizing preselected areas of said printed characters in accordance with said code combinations.

2. In apparatus for producing sequentially printed characters each having associated areas magnetized in individual combinations for each of said characters, the combination of a plurality of electromagnets placed adjacent the area at which said characters are printed, magnetizable printing ink, means for printing said characters using said ink, and means including said electromagnets for magnetizing preselected areas of said printed characters in accordance with said code combinations.

3. Apparatus for producing on a printing medium a reproducible message containing printed characters and associated magnetized encoded areas, comprising a plurality of electromagnets arranged in a pre-selected configuration adjacent said printing medium, means to print said characters on said printing medium, means to actuate said printing means, means to render magnetizable the areas of said printing medium associated with the printed characters, and selecting means controlled by said actuating means, to energize pre-selected ones of said electromagnets in an encoding pattern.

4. Apparatus for producing on record accounting documents of the card or tape type, printed characters comprising magnetized encoded areas, said apparatus comprising movable types, an inked ribbon arranged in the path of movement of said types, the ink of said ribbon having magnetizable material incorporated therein and means for feeding a document or sheet of non-magnetic material through said apparatus in position to receive the impression of said types through said ribbon, actuating members for said types and selecting contacts operated by said actuating members for energizing pre-selected ones of registering relays in accordance with a code combination for each of said types, means for moving a line of said printed characters close in front of a line of magnetizing electromagnets, means for energizing the magnetizing electromagnets during the movement of said line of printed characters in front of said magnetizing electromagnets in accordance with the relays energized for each of said printed characters, whereby each of said printed characters will have magnetized spots in accordance with the code combination corresponding to said character.

5. In an apparatus for producing on a non-magnetizable recording sheet, card or strip, printed characters each having areas magnetized in individual code combinations for each of said characters, magnetizable printing ink, means for printing said characters using said ink, a plurality of electromagnets, a common retaining block supporting said electromagnets adjacent to the printed side of the recording sheet, means for moving each printed character in front of the corresponding electromagnet, and means including said electromagnets for magnetizing successively preselected areas of each of said printed characters in accordance with said individual code combinations during said movement.

6. Apparatus for encoding a message comprising movable types, an inked ribbon arranged in the path of movement of said types, the ink in said ribbon having magnetizable material incorporated therein, means for feeding a sheet of non-magnetic material through said apparatus in position to receive the impression of said types through said ribbon, electromagnets positioned near the area of said material on which characters are printed, actuating members for said types, selecting contacts operated by said actuating members for said types for energizing certain relays of a preselected group of storing relays, said relays when energized closing contacts in accordance with a code combination corresponding to each of said types, means for maintaining the relays so energized, means for moving the part of said sheet bearing said printed characters in front of said electromagnets, a generator for generating a succession of impulses of a determined frequency, means comprising time operated circuit connections associated with said closed contacts of said storing relays and said generator for selecting frequency impulses corresponding to the printed character for each of said printed characters, each of said frequency impulses being constituted by a succession of several waves of said determined frequency and energizing by said frequency impulses said electromagnets in order to magnetize successively corresponding areas of each printed character during the movement of the part of said material, bearing said printed characters, in front of said electromagnets.

7. Apparatus as claimed in claim 6 in which the magnetization of each zone to be magnetized of each of the printed characters is obtained by an alternating induction field produced by the energization of the corresponding electromagnet by a selected one of said frequency impulses timed accordingly by said time operated circuit connections.

8. Apparatus as set forth in claim 6 in which for each printed character by means of selected ones of said storing relays representing code values in the binary system corresponding in combination to the code value of said character and frequency impulses timed by said time operated circuit connections to correspond to the values of each of said selected relays, the corresponding electromagnet is energized to magnetize in succession, when said printed character is moved in front of said electromagnet, different zones of said printed character to represent in combination the numerical value attributed to each of said printed characters.

9. Apparatus for producing on a sheet, card or strip of non-magnetic material, printed characters each having transversal areas magnetized in individual code combinations for each of said characters, comprising movable types, inked ribbon arranged in the path of movement of said types, the ink on said ribbon having magnetizable material incorporated therein, means for feeding the non-magnetic material through said apparatus in position to receive the impression of said types through said ribbon, actuating members for said types, selecting contacts operated by said actuating members for said types for energizing preselected relays in combination code for storing an individual code value for each printed character a series of recording heads, means for moving a part of the tape bearing a line of printed characters in front of said series of recording heads, commutating and selecting means for applying for each printed character frequency impulses according to said code values stored, to the corresponding recording heads during the movement of said line of printed characters in front of said recording heads, said frequency impulses producing in said heads alternating induction fields which magnetize transversal areas of the characters moving in front of said heads.

10. Apparatus for producing on record accounting documents of the card or tape type, printed characters comprising magnetized encoded areas, said apparatus comprising printing means, keys to actuate said printing means for printing said characters in lines on said documents with a colored and magnetizable matter, a register for registering coded components of said characters according to a combination code under the control of said keys, a series of magnetizing heads, means for moving the printed face of said document close in front of said series of magnetizing heads after a line of characters has been printed, means associated with commutating and selecting means for producing frequency impulses and selectively applying said frequency impulses to said magnetizing heads under the control of said register during the movement of said line of printed characters in front of said magnetizing heads, said frequency impulses producing in said heads alternating induction fields which magnetize encoded areas of said printed characters moving in front of said heads.

11. Apparatus for producing sequentially printed characters each bearing associated areas magnetized in individual combination for each of said characters comprising movable type, an inked ribbon arranged in the path of movement of said type, the ink in said ribbon having magnetizable material incorporated therein, means for feeding a sheet of non-magnetic material through said apparatus in position to receive the impression of said type through said ribbon, an electromagnet situated near the position on which each character is printed, actuating members for said type, selecting contacts operated by said actuating members for energizing preselected ones of a group of storing relays in accordance with a code combination particular for each of said type, means for maintaining the storing relays so energized, means for moving the part of said sheet bearing said printed characters in front of said electromagnet, a generator for generating a succession of impulses of a determined frequency, means comprising time operated circuit connections and a vacuum tube associated with said closed contacts of said storing relays and said generator for selecting at least one frequency impulse constituted by a succession of waves of said determined frequency and transmitting said frequency impulse or impulses to said electromagnet in order to magnetize at least one of said areas of said printed character during the movement of said printed character before said electromagnet.

References Cited in the file of this patent

UNITED STATES PATENTS

| 2,261,542 | Dickinson | Nov. 4, 1941 |
| 2,294,679 | Maul | Sept. 1, 1942 |
| 2,337,553 | Hofgaard | Dec. 28, 1943 |
| 2,359,617 | Bryce | Oct. 3, 1944 |

FOREIGN PATENTS

| 538,016 | Great Britain | July 17, 1941 |